Feb. 7, 1950 — W. G. BONHAM — 2,496,433
COMBINATION INCUBATOR AND BROODER
Filed Dec. 22, 1943 — 3 Sheets-Sheet 1
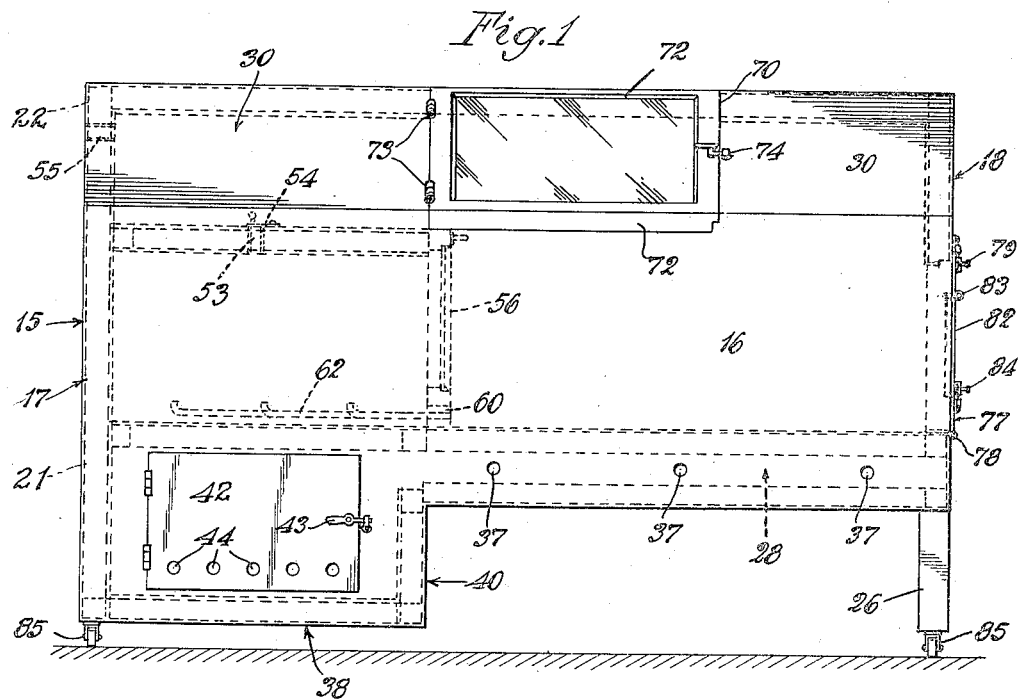
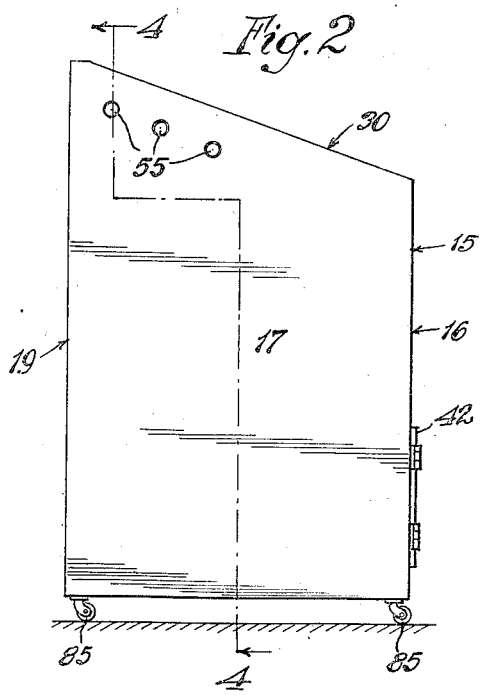
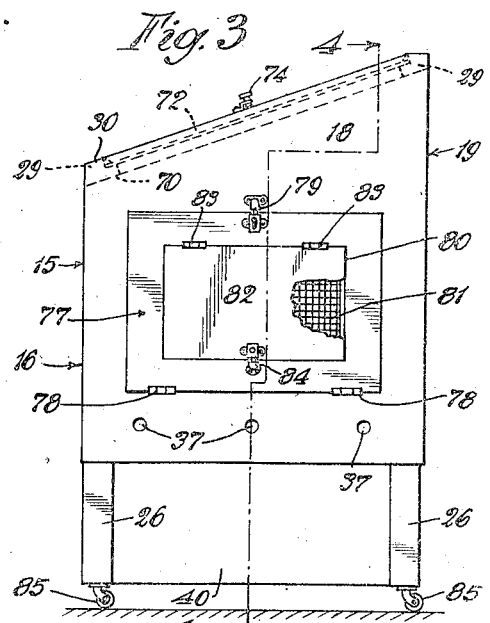
Inventor
Walter G. Bonham
by Joshua R. H. Potts
His Attorney.

Inventor
Walter G. Bonham
by Joshua R. H. Potts
His Attorney.

Feb. 7, 1950
W. G. BONHAM
2,496,433
COMBINATION INCUBATOR AND BROODER
Filed Dec. 22, 1943
3 Sheets-Sheet 3
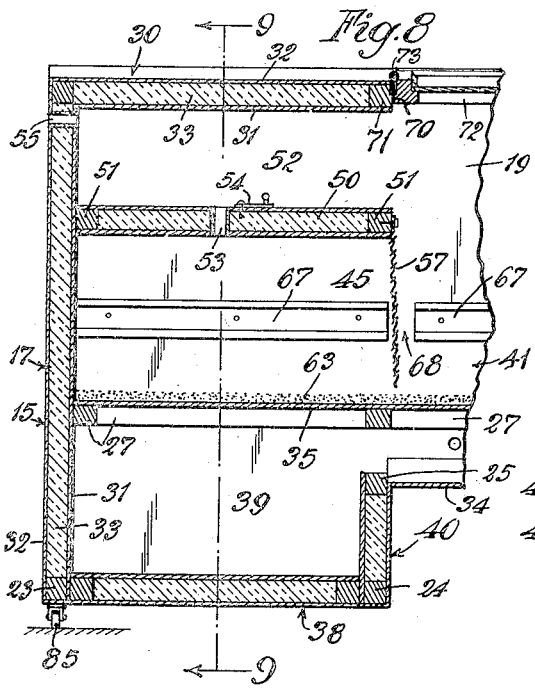
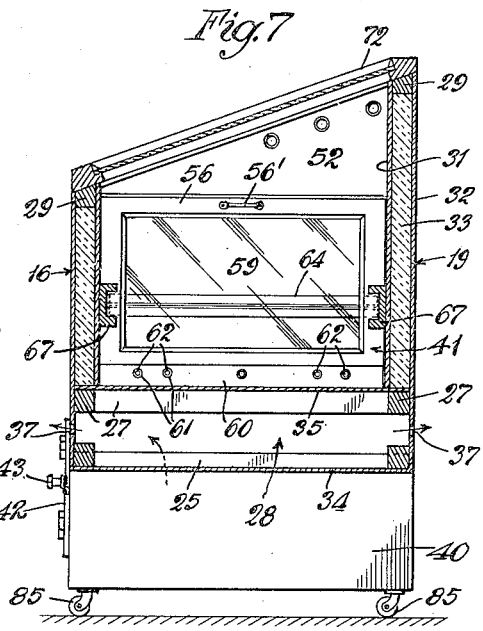
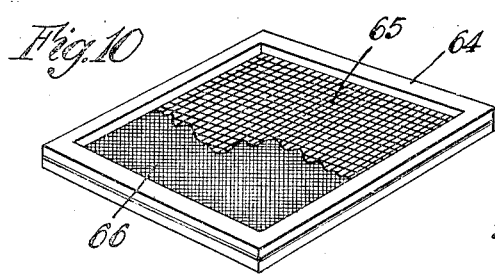
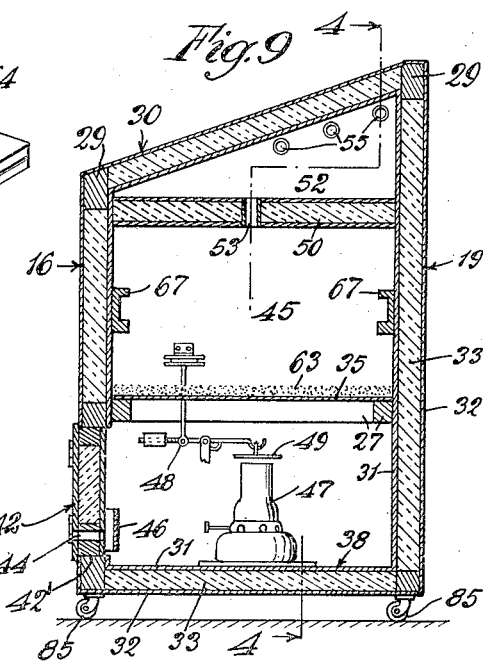
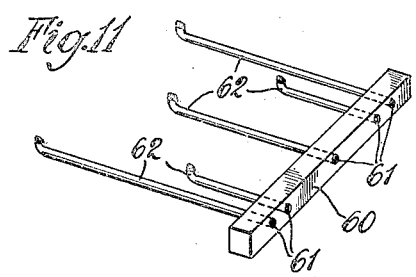
Inventor
Walter G. Bonham
by Joshua R. H. Potts
His Attorney Patented Feb. 7, 1950

2,496,433

UNITED STATES PATENT OFFICE 2,496,433

COMBINATION INCUBATOR AND BROODER

Walter G. Bonham, Chicago, Ill., assignor of one-half to Frank Vlchek, Jr., Chicago, Ill.

Application December 22, 1943, Serial No. 515,239

8 Claims. (Cl. 119—30)

My invention relates to a combination incubator and brooder and is suitable for outdoor as well as indoor use, and may be called a portable outdoor incubator and brooder.

An important object of the invention is to provide a combination incubator and brooder in a single structure having an egg hatching or incubating compartment or chamber and a brooder compartment or chamber both heated from a single heating source in a lamp or heater compartment situated beneath the hatching compartment, and in which the hatching compartment can be closed off from the brooder compartment during the incubation period to permit economical and efficient heating of the hatching compartment and eggs during the incubation period and maintenance of a uniform temperature of approximately 102° F. with proper humidity and convenient periodic turning of the eggs, especially during the first 18 days, and in which fresh air is supplied to the incubation or egg chamber in a warm or preheated condition through the brooder chamber to insure a uniform temperature in the egg chamber without cold air drafts such as might interfere with proper, efficient and maximum incubation and hatching of the chicks from the eggs.

Another object is to provide means for establishing communication between the incubator and brooder compartments when occasion demands.

Another object is to provide for the maintenance of proper moisture or humidity in the egg or hatching compartment during the incubation period, so that the eggs will be subjected to heated air in the proper moist condition to facilitate incubation and hatching to the highest degree and a maximum hatch of healthy chicks, as well as to facilitate turning of the eggs during the incubation period, and also, to provide a structure and arrangement which will permit the chicks to pass directly into the brooder chamber without requiring that they be handled, and permitting them to run about and given proper air in warm weather, as well as to run in and out of the brooder in hot weather, and in addition, protected in the shade beneath the brooder.

Another object is to facilitate turning of the eggs by moving the tray into the heated brooder chamber without danger to incubation and hatching, where the eggs are easily accessible through a door or window opening forming a skylight in the top of the brooder chamber, which also furnishes light and sunshine.

A still further object is to so construct the combination incubator and brooder that it is of relatively light weight and inexpensive as compared to ordinary incubators and brooders ordinarily built into a building or house, as well as portable and capable of being wheeled about thereby admirably adapting it for outdoor use or in different places, and especially for use by farmers or others for raising chickens for their own use and consumption, as distinguished from large production for sale purposes.

A further object is to provide a double drop ventilating and exit door for the remote end of the brooder chamber which permits ventilation and supplying of preheated air from the brooder chamber fresh from the outside atmosphere, to the hatching or egg compartment without too much air or a draft, and in which the doors when dropped down form an inclined approach or runway for making easy exit from and entrance into the brooder during the very young stages of the chicks, until housed in a separate chicken house.

Further objects and advantages will appear and be brought out more fully in the following specification, reference being had to the accompanying drawings, in which—

Fig. 1 is a front elevation of a combination incubator and brooder constructed in accordance with my invention.

Fig. 2 is an end elevation of the device looking toward the left-hand end of Fig. 1.

Fig. 3 is an end elevation looking toward the right-hand end in Fig. 1.

Fig. 7 is a transverse vertical sectional view taken on the line 7—7 of Fig. 4.

Fig. 8 is a fragmentary longitudinal sectional view corresponding to Fig. 4 but showing the brooder curtain in position.

Fig. 9 is a transverse vertical sectional view taken on the line 9—9 of Fig. 8.

Fig. 10 is a perspective view of an egg tray, and

Fig. 11 is a perspective view of a panel for supplying fresh warm air to the hatching or incubation chamber.

Figure 4:
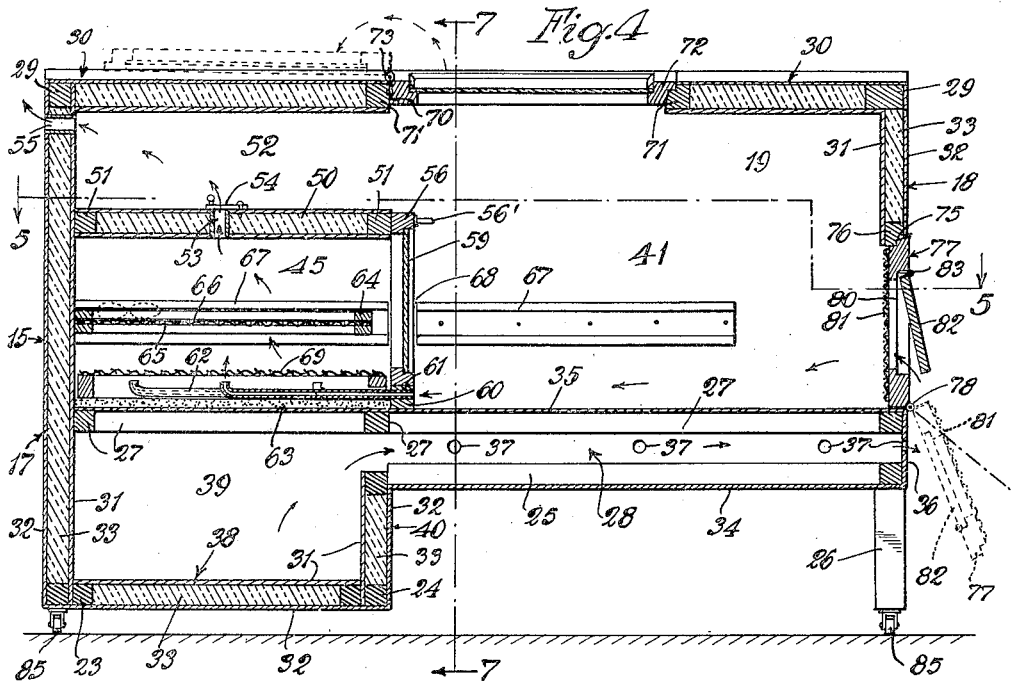
Fig. 4 is a vertical longitudinal sectional view taken on the section lines 4—4 of Figs. 2, 3 and 9.
Figure 5:
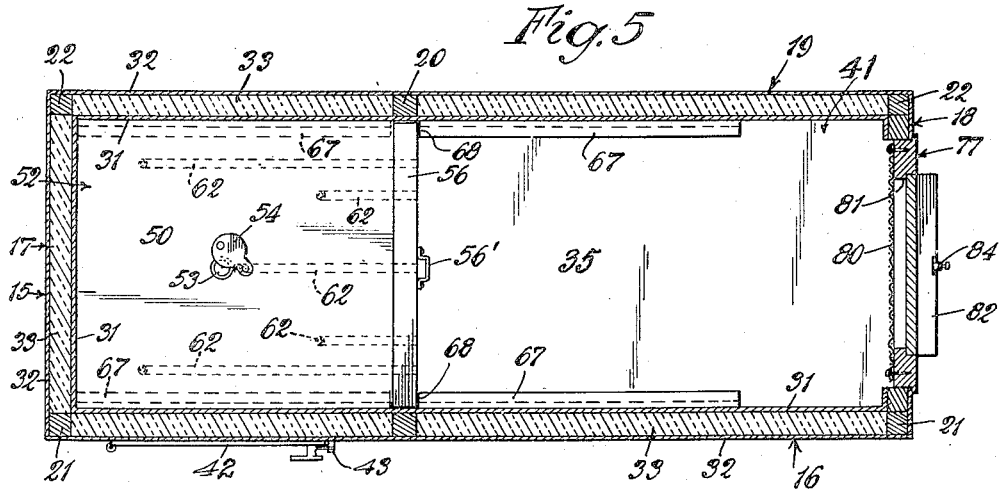
Fig. 5 is a horizontal longitudinal sectional view taken on the line 5—5 of Fig. 4.
Figure 6:
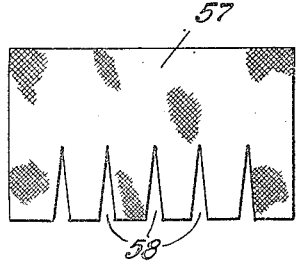
Fig. 6 is an elevation of a brooder curtain employed between the egg hatching or incubation chamber and the brooder chamber after the eggs have been hatched.

Referring to more particularly to the drawings in detail, the device is shown as comprising a horizontally elongated housing or casing 15 of substantially rectangular outline having a vertical front wall 16, vertical end walls 17 and 18, and a vertical back or rear wall 19 joined at their vertical corners or ends to a frame structure 20. This frame structure 20 includes vertical corner members 21 and 22 at the front and rear of the housing, the front corner members being shorter than the rear corner members and terminating short of the upper ends of the latter. A lower horizontal bottom frame 23 is provided at the bottom of one end portion of the housing and preferably extends less than one half of the length thereof to support a short vertical frame 24 at the inner end thereof transversely of the housing from the front to the rear. This vertical frame 24 has a raised horizontal frame 25 extending from the upper end thereof to the far end 18 of the housing spaced above the bottom 23 to leave the housing open therebeneath and provide corner legs 26 extending downwardly from the end frame of the end 18 and produced by the vertical corner members 21 and 22 at said end.

A raised horizontal bottom or intermediate frame 27 is provided above the frame 25 preferably extending throughout the length and breadth of the housing in spaced relation to and above the upper end of the vertical frame 24 and correspondingly related to the frame 25 to provide a duct or passage 28 preferably of shallow formation and open at its inner end.

A top or upper frame 29 is provided at the top of the housing and inclines or slopes forwardly as shown, thus disposing the lower longitudinal front member of this frame at a lower elevation than the rear longitudinal member thereof with the ends of said frame inclined forwardly to support the top or roof 30 in a similar position. Suitable rafters and cross members may be provided at the ends and intermediately of the length housing and frame structure respectively, to support the top and form a rigid structure. The front, rear and end walls are of double formation, having inner and outer sheets 31 and 32 of suitable material, preferably fireproof such as sheet metal or galvanized sheet iron, asbestos, fireproof wall board, plaster board, or the like, between which is a filling or packing 33 of heat and cold insulation such as comminuted or flake rock wool, asbestos, mineral wool, sawdust or the like, to exclude heat and cold and keep in the warmth to maintain the interior temperature of the housing and chambers or compartments thereof as desired. Below the frame 25, a wall 34 is provided and above the frame 27 a flooring 35 is provided, this wall 34 and the flooring 35 being preferably of sheet metal and of single ply formation instead of having a double walled structure at these points so as to entirely enclose the passage or channel 28 therebetween and between the front and rear or back walls of the housing. The outer end of the passage 28 is closed by an end wall 36, but may be provided with ventilating openings 37 as are also the front and back walls of the housing in line with the passage. If desired, the wall 34 and flooring 35 may be padded with a sheet of asbestos or plaster board to keep out the cold and thus give additional warmth to the interior of the housing or egg chamber and brooder room.

The bottom wall 38 of the heating chamber or lamp room 39 formed beneath the flooring 35 and between the end wall 17, front wall 16, rear wall 19 and a short vertical inner wall 40 at the frame 24, is also preferably of double formation as is the wall 40. These walls as well as the walls of the housing are preferably covered on the outside with sheet metal such as galvanized sheet iron and lined on the inside with plaster board or sheet asbestos. This heating compartment is therefore depressed with respect to the bottom wall 34 and the flooring 35 of the brooder room or chamber 41 and the vertical wall 40 at the inner end of the bottom wall or flooring 38 is disposed in spaced parallel relation to the end wall 17 and extends upwardly to the frame 25 and bottom wall 34 forming a supplementary floor beneath the brooder room or chamber to form the shallow heating space or escape duct 28 beneath the floor 35 and extending longitudinally from the top and inner side of the heating compartment or lamp chamber 39 to the opposite end or wall 18 of the housing remote from the end wall 17 and compartment 39 with which it also communicates by reason of being freely open at its inner end, although this end may be controlled as to its degree of opening if desired, and as it is thought will be obvious.

A door 42 is provided for the lower heating or lamp compartment 39 such as over an opening 42' in the front wall 16 with a suitable closure means or latch fastener 43. Openings 44 are provided in a wall of the compartment 39, such as through the door 42 near the bottom thereof to admit fresh air to said compartment to support combustion and to circulate heated air or gases and products of combustion beneath the floor 35 in the passage or space 28 to heat the brooder chamber 41 constituting a portion of the interior of the housing thereabove, as well as air passing therethrough to the incubation chamber 45 as will be further explained. A guard or baffle wall 46 may be mounted on the door 42 at the inner side thereof in spaced relation to the openings or holes 44 so that the air or wind will be deflected and prevented from directly striking the heater or lamp 47 mounted within the heating compartment 39. This heater may be of any suitable type such as an electric heater, a kerosene lamp, or otherwise, controlled as to temperature and humidity from within the incubation chamber 45 by means of a suitable thermostat or balanced regulator placed adjacent to a thermometer within the egg or incubation chamber as is common in the art.

As shown, the heater or lamp 47 is provided with a regulator 48 having a lid or plate 49 over the chimney thereof and set so as to balance about one-half (½) inch above the lamp chimney when the temperature in the egg chamber is between 101° F. and 102° F. This balanced regulator is mechanically arranged and adjusted so that the lid cannot drop closer than one-fourth (¼) of an inch from the top of the lamp chimney, thus avoiding a smoking lamp. The hot air and gases or products of combustion from the lamp pass out through the chimney and strike against the regulator lid and then against the bottom or floor of the egg chamber and then pass into and through the passage 28 under the brooder room or chamber to escape through the openings or holes 37, constituting vents for the lamp chamber and passage at the sides and end of the latter. This hot air from the heater and the hot gases or products of combustion of a lamp, such as an oil burner or kerosene lamp, will maintain the temperature in the egg chamber between 101° F. and 102° F., and that in the brooder chamber between 65° F. and 70° F. However, it may be stated that the temperature of the egg chamber or compartment is kept at 95° F. during the first week following the hatch, and decreasing 5° thereafter each week to a final 70° F., while the temperature of the brooder room or chamber is kept at about 65° F. to 70° F.

A horizontal wall 50 is provided in the housing above the floor 35 over the heating compartment or lamp room 39 and includes a horizontal frame 51 extending inwardly from the end wall 17 and across the breadth of the housing between and connecting the front wall 16 and the rear, or back wall 19, and forms the roof of the hatching or incubation chamber 45. This wall is of double formation and may have top and bottom layers of sheet iron and plaster board, or sheet asbestos. It forms the floor of a top compartment 52 between the same and the top or roof 30 of the housing so that there are four compartments in all within the housing.

The wall 50 is provided with a ventilator hole 53 over which a regulator plate 54 may be provided to control the venting of the hot and foul air within the egg chamber, as well as to maintain the latter at the desired temperature. Suitable holes 55 are, also, provided in the adjacent end wall 17 near the top for venting the brooder chamber 41 and the top compartment 52, and, it is to be understood that any or all of the holes or openings 37, 44 and 55 may be controlled or regulated the same as the hole 53, or corks may be placed in these holes, or certain of them, until the temperature is raised to the desired point, or to better regulate the temperatures of the egg chamber and the brooder chamber.

A removable window 56 forming a vertical wall or partition is provided at the inner end of the egg chamber to close or seal off the same from the brooder chamber, and may be removed, as by a handle 56', after the eggs have hatched and a brooder curtain 57 hung from the top or roof 50 of the egg compartment 45 in place thereof. This curtain is provided with V-notches 58 at its bottom edge to allow the chicks to pass into and out of the brooder chamber. Preferably, the window frame 56 has a glass panel 59, but may be of any other suitable structure to form a vertical wall or partition at the inner end or side of the egg chamber and may rest upon a panel or stringer 60 extending across the housing between the front and back walls thereof.

This panel is provided with a series of holes 61, shown as five in number, and adapted to take tubes 62 of different lengths, extending into the bottom of the egg chamber to allow air in the brooder chamber to be heated before entering the egg chamber at different points throughout the area thereof, so as to supply fresh, clear, heated air to the eggs and assist in maintaining the temperature of the egg chamber uniform throughout.

It may, also, be mentioned that the hole 53 in the center of the top or ceiling of the egg chamber is kept closed for the first two days of the period of incubation and then half closed for the next two days, after which it is left wide open for the balance of the hatch. The bottom of the egg chamber is covered with a layer 63 of sand, preferably from one to one and one-half inches thick and this sand is kept wet to supply the correct amount of moisture for the eggs, which is governed by a hydrometer placed on an egg tray 64 suitably supported in the egg chamber alongside of a thermometer mounted thereon. The egg tray preferably consists of a frame of substantially square shape, such as approximately 20 inches square, provided with one-half inch wire mesh 65 which may be covered with cloth netting 66 and is set in the egg chamber preferably about six inches above the sand floor. The thermometer is set on this tray and kept at a temperature of approximately 102° F. under proper regulation at which time the brooder room is kept at from 65 to 75° F. As shown, this egg tray may be slidably mounted in guideways 67 secured at the inside to the front and back walls 16 and 19 so that the egg tray may be moved into the brooder compartment when the wall or partition 56 is removed so that the eggs may be gently rolled twice daily. The guideways are shown provided with slots 68 to accommodate the removable window forming the wall or partition 56. However, if desired, the egg tray or trays may be simply taken out of the egg chamber and set on the floor of the brooder room or chamber in order to roll the eggs as stated, after which the tray is replaced and then the removable window placed into position. Of course, the window is removed entirely after the hatch in order to permit the curtain 57 to be hung in place so that the chicks can run in and out from the egg chamber to the brooder room. A wire mesh nursery tray 69 is preferably provided about one-half inch above the layer of sand over the bottom of the egg chamber to avoid the chicks getting wet when they drop from the egg tray onto this nursery tray at the hatching time.

In order to obtain access to the brooder compartment or chamber 41 and the regulator 54, as well as to the hatching or incubation chamber 45 and the trays therein, such as when turning the eggs or for cleaning the parts, the roof or top 30 is provided with the opening 70 having a surrounding frame 71 in which a large window 72 extending over the front and back walls of the housing is hinged as at 73. In this manner the window may be swung open on the hinges against the top or roof at one side as indicated in dotted lines in Fig. 4 of the drawings. When closed, the window may be held by a fastener or latch 74. The purpose in having the window extend over the upper edges of the front and rear walls or the top frame 29 is so that it will drain water in rainy weather and keep the same out of the compartments of the housing. This is desirable because the device is also intended for outdoor use where fresh, clean air may be supplied, instead of placing the device in a cellar or indoors. To facilitate this, the end wall 18 is provided with an opening 75 with a surrounding frame 76 extending to the floor 35 and a double drop door 77 is mounted in this opening. This door is hinged at the bottom as indicated at 78 and is provided with a latch or fastener 79 whereby it may be held closed. The central opening 80 in the door 77 produced by the frame thereof may have a screen panel 81 at the inside and a supplementary door or panel 82 is hinged at its upper edge to the top of the opening as indicated at 83 and provided with a fastener or latch 84 whereby it may be held closed at the bottom. Thus, the panel or supplementary door 82 may be opened as shown in Fig. 4 to permit clear, fresh air to enter the brooder chamber there to be preheated due to the heating of the chamber by the heated air or gases passing through the passage 28, so as to be preheated before passing into the egg chamber through the holes 61 or tubes 62. Of course, both doors may be opened in warm weather but this is not ordinarily done. The double drop door is therefore so arranged that the wind cannot blow into the brooder room and the outside panel or supplementary door 82 is used in part to regulate the temperature of the brooder room by opening it more or less as governed by the thermometer in the brooder room or that in the egg chamber. It will also be seen that by swinging the door 77 downwardly at the proper inclination in the manner shown in dotted lines in Fig. 4 of the drawings but more properly at a position approximating that shown by the dot and dash lines in said figure and then swinging the door panel 82 upwardly in line therewith and against the door 77, a runway will be produced so that the chicks may run into and out of the brooder in suitable weather. Also, it will be obvious that the chicks may obtain a shaded area under the raised bottom of the housing beneath the brooder chamber and passage 28 produced by the walls 34 and 35, in hot weather.

By this invention, fresh air is supplied to the brooder room or chamber and is kept at an even temperature and this air is preheated before entering into the egg chamber so that the temperature in the latter may be easily controlled and properly regulated. The device also avoids the necessity of handling the chicks especially where separate incubators and brooders are employed thus eliminating fatalities in transferring the chicks from an incubator to a brooder. It is also unnecessary to seek a damp cellar or to place the device indoors where there is not much variation in temperature, because the temperature of the present combination incubator and brooder can be regulated and kept regulated outdoors as well as in any cellar and the air that reaches the egg chamber is of a fresher caliber. This therefore makes the ability to supply moisture through both the brooder room and the egg chamber a very simple feature instead of a difficult problem. Also, because all of the artificial heat is excluded from directly entering the brooder chamber and the egg chamber but rather comes from below and circulates under the floor of the egg chamber and the brooder room, the floors are maintained warm so that the chicks' feet are kept warm instead of their heads, thereby eliminating any cold draft from under the floors and maintaining the chicks in a healthier condition. Due to the regulation of the temperature and humidity in the egg chamber as well as the heating of the air from the bottom in the brooder chamber and supplying preheated fresh air from the atmosphere to the egg chamber, the device will hatch a higher percentage of chicks from eggs set and after the chicks are hatched they may be maintained in the brooder room for from seven to ten days, after which they may be let out of the brooder room weather permitting. Since the device may be used outdoors and is provided with casters or wheels 85, the device may be wheeled about from place to place or since it is so light in weight, may be picked up and carried from place to place by two persons thereby keeping the same on fresh ground or grass. For the operator's convenience, the device may be placed under some shelter such as a tent or otherwise during the period of incubation and then immediately after the hatch, it can be placed out in the open or the shelter or tent removed because it is no longer necessary to open the top of the housing to turn the eggs or make inspections and feeding can be done in or from known fountains and hoppers. This invention will not interfere with the business of big hatcheries employing large and bulky incubators and large separate brooder structures, but is for the small fellow or farmer who would want from 100 to 500 chicks which may be moved from the hatchery to the farm or enclosure and chicken house in the device, thereby making it unnecessary to handle the chicks or to hurry home for fear of the chicks becoming chilled. That is, the device will hatch the eggs and then raise the chicks during the time that they need artificial heat, say two months, since the chicks are able to run about after they are from seven to ten days old, weather permitting. While there is no limitation as to size or capacity, I am not aware that there is any combination incubator and brooder of this type available or on the market or which has heretofore been produced and which will permit the same to be operated either indoors or outdoors, thereby obviating the necessity of having an incubator or incubator room and a separate brooder house such as now being used in the form of either large devices or small frail indoor devices of like capacity. The device will also eliminate the additional cost of fire insurance due to the operation of incubators of like capacity in a home.

In view of the foregoing, it is believed that the structure and operation of the device will be readily apparent and further description is therefore omitted.

While I have illustrated and described the preferred form of construction for carrying my invention into effect, this is capable of variation and modification without department from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A combination incubator and brooder comprising a horizontally elongated enclosure, a lamp chamber at one end of the enclosure, a wall above the lamp chamber and extending below the remainder of the enclosure, a hatching chamber in the enclosure above said wall and having a removable side forming a brooder chamber within the enclosure, means for ventilating the chambers and admitting air to the lamp chamber, a bottom wall beneath the aforesaid wall and forming a space open at one end in communication with the lamp chamber whereby heated air and gases will pass through said space to heat the brooder chamber and air passing therethrough for entry into the hatching chamber, means to obtain access to the brooder chamber, and one or more egg trays in the hatching chamber adapted to be moved in the brooder chamber.

2. A combination incubator and brooder including a horizontally elongated insulated housing, a lower lamp chamber, a floor forming a wall above the lamp chamber, a passage leading from the lamp chamber beneath the floor, an incubation chamber in the housing above the lamp chamber and having an inner wall dividing the housing to form a brooder chamber communicating with the incubation chamber, means to slidably support an egg tray for movement from the incubation chamber into the brooder chamber, means for obtaining access to said tray through the top of the housing, and a double hinged door for the end of the housing remote from the incubation chamber, said door being hinged at the bottom with its bottom edge at the floor and having a hinged panel over an opening therein, said panel being hinged at the top to swing coextensively with the door to form a runway.

3. A device of the class described including a housing, a brooder chamber therein having a floor, a duct through which heated air and gases or products of combustion pass beneath the brooder chamber for heating the same, an incubator positioned within and on the floor of the brooder chamber, and a removable closure at one end of the incubator chamber adapted to open the incubator chamber to the brooder chamber to enlarge the brooder chamber after hatching, air passages whereby heated air of the brooder chamber is used in the incubator, a door opening at one end of the brooder chamber, a door hinged at the bottom of the opening to swing downwardly, means to hold the door closed upwardly, said door having a screened opening and a door over said screened opening and hinged at the top to swing outwardly and upwardly when the first door is opened to form an approach so that chicks may run into and out of the brooder chamber.

4. A device of the class described comprising a horizontally elongated housing enclosed on all sides and having a forwardly inclined top with an opening, a closure for said opening, a raised horizontal bottom portion for the housing, an incubation chamber on said bottom and having a top wall, an openable wall at the inside of the incubation chamber and having openings near the bottom, a brooder chamber in the housing on said bottom, means beneath the bottom to heat the incubation chamber, a duct leading from the heating means beneath the brooder chamber to warm the latter and preheat air passing through the brooder chamber before entry into the incubation chamber and a tray supported in the incubation chamber for the movement into the brooder chamber for access thereto through the top opening of the housing.

5. A combination brooder and incubator comprising a brooder chamber, an incubator positioned within said chamber wherein the floor of the brooder also forms the floor of the incubator, a closure adapted to close the interior of the incubator from the brooder, said closure having openings communicating with both the incubator and brooder, a heating chamber below the floor and positioned below the incubator, a duct positioned below the floor of the brooder communicating with said heating chamber, and egg tray holding racks in said incubator and brooder.

6. A combination incubator and brooder comprising a housing, a heating chamber at one end of the housing, a wall above the heating chamber and extending below the remainder of the housing, a hatching chamber in the housing above said wall and over said heating chamber and having a removable side forming a brooding chamber within the housing, a conduit communicating with the heating chamber and passing under the wall beneath the brooder chamber whereby heated air and gases will heat said brooder chamber.

7. A combination incubator and brooder comprising a housing, a heating chamber at one end of the housing, a wall above the heating chamber and extending below the remainder of the housing, a hatching chamber in the housing above said wall and over said heating chamber and having a removable side forming a brooding chamber within the housing, a conduit formed by a second wall beneath the aforesaid wall communicating with the heating chamber and passing beneath the brooder chamber whereby heated air and gases will heat said brooder chamber, and means for ventilating the chambers and admitting air to the heating chamber.

8. A combination incubator and brooder comprising a horizontal elongated insulated housing, a heating chamber at one end of the housing, a wall above the heating chamber extending throughout the housing, a hatching chamber in the housing above said wall and over said heating chamber, and having a removable curtain at one end forming a brooder chamber within the housing, tubular means for admitting air from said brooder chamber into said hatching chamber, egg trays supported above the bottom of said hatching chamber, a bottom wall beneath the aforesaid wall forming a space open at one end in communication with the heating chamber whereby heated air and gases will pass through said space to heat the brooder chamber, a door in the outside of said housing opening into said heating chamber and having baffled vent holes therein, and a door in the outside of said housing opening into said brooder chamber to obtain access thereto and to provide a runway.

WALTER G. BONHAM.

REFERENCES CITED

The following references are of record in the file of this patent:

UNITED STATES PATENTS

| Number | Name | Date |
| --- | --- | --- |
| 260,219 | Muenchinger | June 27, 1882 |
| 335,422 | Beuerlein | Feb. 2, 1886 |
| 348,368 | Worswick | Aug. 31, 1886 |
| 516,880 | Snook | Mar. 20, 1894 |
| 518,003 | Duncan | Apr. 10, 1894 |
| 835,871 | Snover | Nov. 13, 1906 |
| 977,973 | Sheer | Dec. 6, 1910 |
| 1,075,747 | Zimmer | Oct. 14, 1913 |
| 1,176,496 | Sullivan | Mar. 21, 1916 |
| 1,303,804 | Kohl | May 13, 1919 |
| 1,574,757 | Pommer | Mar. 2, 1926 |
| 1,883,272 | Zellner | Oct. 18, 1932 |

FOREIGN PATENTS

| Number | Country | Date |
| --- | --- | --- |
| 213,170 | Great Britain | Mar. 27, 1924 |